US006738777B2

(12) United States Patent
Bliss et al.

(10) Patent No.: US 6,738,777 B2
(45) Date of Patent: May 18, 2004

(54) CHAINING ACTIONS FOR A DIRECTED GRAPH

(75) Inventors: Andrew L. Bliss, Redmond, WA (US); Kyle R. Johns, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 324 days.

(21) Appl. No.: 09/681,072

(22) Filed: Dec. 20, 2000

(65) Prior Publication Data

US 2002/0078055 A1 Jun. 20, 2002

(51) Int. Cl.$^7$ .................................. G06F 17/30
(52) U.S. Cl. ........................ 707/100; 707/101
(58) Field of Search ................. 707/100, 101

(56) References Cited

U.S. PATENT DOCUMENTS

| | | | | |
|---|---|---|---|---|
| 5,524,077 A | * | 6/1996 | Faaland et al. | 705/8 |
| 5,751,914 A | * | 5/1998 | Coley et al. | 706/47 |
| 5,870,545 A | * | 2/1999 | Davis et al. | 709/201 |
| 5,873,081 A | * | 2/1999 | Harel | 707/3 |
| 6,292,797 B1 | * | 9/2001 | Tuzhilin et al. | 707/6 |
| 6,324,550 B1 | * | 11/2001 | Huetter | 707/206 |
| 6,341,302 B1 | * | 1/2002 | Celis | 709/100 |

OTHER PUBLICATIONS

Press Release, "TGS Demonstrates HP's DirectModel Technology on SGI, Sun and Windows at SIGGRAPH '97; TGS to Deliver Toolkits and Applications," SIGGRAPH '97, Los Angeles, CA, Aug. 4, 1997, 2 pages.

White Paper: Cripe, Brian E. and Gaskins, Thomas A., The Directmodel Toolkit: Meeting the 3D Graphics Needs of Technical Applications; Date unknown—please admit as prior art. [9 pages].

* cited by examiner

Primary Examiner—Wayne Amsbury
Assistant Examiner—CamLinh Nguyen
(74) Attorney, Agent, or Firm—Woodcock Washburn LLP (57) ABSTRACT

A plurality of actions are applied to a directed graph, where the directed graph has a plurality of nodes. A node in the directed graph is traversed to, and an specific method for each of the plurality of actions is performed on the traversed-node. The traversing and performing are repeated until all nodes in the directed graph have been traversed to. Only a single traversal of the directed graph need be performed to apply all of the actions to the directed graph. The plurality of the actions are in the form of a chain. Each action has an action object pointer, and the actions include a base action at a tail end of the chain and at least one chain action at a head end of the chain. The action object pointer of each chain action points to an immediately adjacent action toward the tail end of the chain, and the action object pointer of the base action points to the chain action at the head end of the chain.

16 Claims, 7 Drawing Sheets

COUNT [TYPE 0]
[for node 12, type 0][
INCREMENT

==>                     DRAW [TYPE 0]
                        {drawing procedures}
                        DISPATCH [child 12a]
                            ==>                     COUNT [TYPE 1]
                                                    [for node 12a, type 1]
                                                    INCREMENT ==> (to Fig. 5B)

Fig. 5

RETURN
                        DISPATCH [child 12b] <== (from Fig. 5B)
                            ==>                     COUNT [TYPE 2]
                                                    [node 12b, type 2]
                                                    INCREMENT ==> (to Fig. 5B)

RETURN
                        RETURN                      <== (from Fig. 5B)
RETURN                  <==

Fig. 5A (from Fig. 5A)
DRAW [TYPE 1]
{drawing procedures}

==>         COUNT [TYPE 2]
            [for node 12aa, type 2]
            INCREMENT ==>         DRAW [TYPE 2]
                                    {drawing procedures}
                                    RETURN
                        RETURN      <==
RETURN      <==
<== (to Fig. 5A)

(from Fig. 5A)
DRAW [TYPE 2]
{drawing procedures}
RETURN
<== (to Fig. 5A)

CHAINING ACTIONS FOR A DIRECTED GRAPH

BACKGROUND OF INVENTION

1. Technical Field

The present invention relates to performing multiple actions with regard to a directed graph such as a directed acyclic graph. More specifically, the present invention relates to chaining such actions such that only a single traversal of the directed graph need be performed to perform such actions.

2. Background

A directed graph such as a directed acyclic graph may be employed by an application to represent a collection of data. For example, in at least some applications that are visually oriented, a "scene" that is to be rendered by the application is organized by the application in the form of such a directed graph example, if the scene includes a room with a person in the room, the directed may include a root node or container at a first level and a person description node and room description node at the second level. At the third level and directly below the person node may be a head node, body node, and limb nodes for the person, each of which variously further defines body parts of the person. Likewise, at the third level and directly below the room node may be a plurality of wall nodes, each of which variously further defines walls within the room. As may be appreciated, further levels of nodes may be provided to even further define elements of the in a progressively more detailed manner. It is not atypical, that a directed graph have on the order of thousands of nodes, for example.

Thus, the directed graph defines every element of the scene such that each element is available for rendering a particular view within the scene. Notably, a particular view need not necessarily include every element within the scene/node within the directed graph. For example, in "looking" in a particular direction, one or more walls of the room of the scene may not be "visible". Likewise, depending on granularity of the view, more finely detailed elements may or may not be For example, if the person is seen from afar in the view, the fingers of such person are not especially noticeable.

As may now be appreciated, then, to construct a view based on the directed graph, one or more actions are performed with regard to the directed graph to produce a cumulative effect. For example, one action may be to cull out nodes or containers of the graph that would not be visible based on the view looking in a particular direction. Another action may be to cull out nodes or containers of the graph that would not be visible based on being too finely detailed. A further action may be to actually draw the view based on the nodes or containers remaining after the culling action.

In general, to perform an action with regard to a directed graph, the directed graph is traversed and a method related to the action is applied to each node, the method applied is based on the type of node. Typically, the traversal begins at the first level of the directed graph, and all "children" of a node (i.e., (n)th level nodes depending from an (n−1)th level node) are dealt with prior to dealing with "siblings" of a node (i.e., nodes at the same (n)th level and all depending from an 1)th level node).

In the prior art, for each action to be taken with respect to a directed graph, a separate traversal of the graph was performed. However, and as should be appreciated, each traversal requires time and resources, especially for a directed graph having on the order of thousands of nodes. Moreover, each traversal may require creation of intermediate scene graphs to hold temporary results as the actions are applied.

As may also be appreciated, to construct a moving view based on the directed graph, a series of views must be constructed and sequentially displayed at a rate of 20 to 30 views per second. Accordingly, traversing the directed graph for each action for each view quickly becomes a considerable effort. Moreover, performing a traversal for each action for each view must now be performed within a set time in order to provide the views at the aforementioned display rate.

If a programmer desires to perform many operations at a node during a single traversal, such programmer can of course design a single highly specific action performs all of the operations. However, and importantly, there are so many operations that can be performed that it is impossible and/or impractical to write the single highly specific actions necessary to cover all possible combinations of operations. It is much more efficient to define each operation as a single action then to dynamically and flexibly chain the single actions together once the desired combination of operations is known.

Accordingly, a need exists for a method and mechanism for applying multiple actions to a directed graph in a single traversal of such directed graph. In a need exists for a method and mechanism for "chaining" the multiple actions such that all of the multiple actions are applied in sequence to each node in the directed graph before moving on to the next one. As may be appreciated, with such single traversal, the need for creating intermediate graphs is obviated. Further, a need exists for allowing chaining of actions in a flexible and dynamic manner such that the cumulative effect achieved by such chaining of actions is also flexible. Thus actions with very specific effects can be combined in arbitrary ways, and an application can then mix and match actions to suit particular needs.

SUMMARY OF THE INVENTION

The aforementioned need is satisfied by the present invention a method of applying a plurality of actions to a directed graph, where the directed graph having plurality of nodes branching out into multiple levels. In the method, a node in the directed graph is traversed to, and an action-specific method for each of the plurality of actions is performed on the traversed-to node. The traversing and performing are repeated until all nodes in the directed graph have been traversed Importantly, only a single traversal of the directed graph need be performed to all of the actions to the directed graph.

To effectuate such method, a chain comprising a plurality of the actions to be applied to the directed graph is constructed. Each action has a structure including state information comprising an action object pointer. The actions include a base action at a tail end of the chain and at least one chain action at a head end of the chain. The action object pointer of each chain action points to an immediately adjacent action toward the tail end of the chain, and the action object pointer of base action points to the chain action at the head end of the chain.

BRIEF DESCRIPTION OF DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION

Computer Environment

Figure 1:
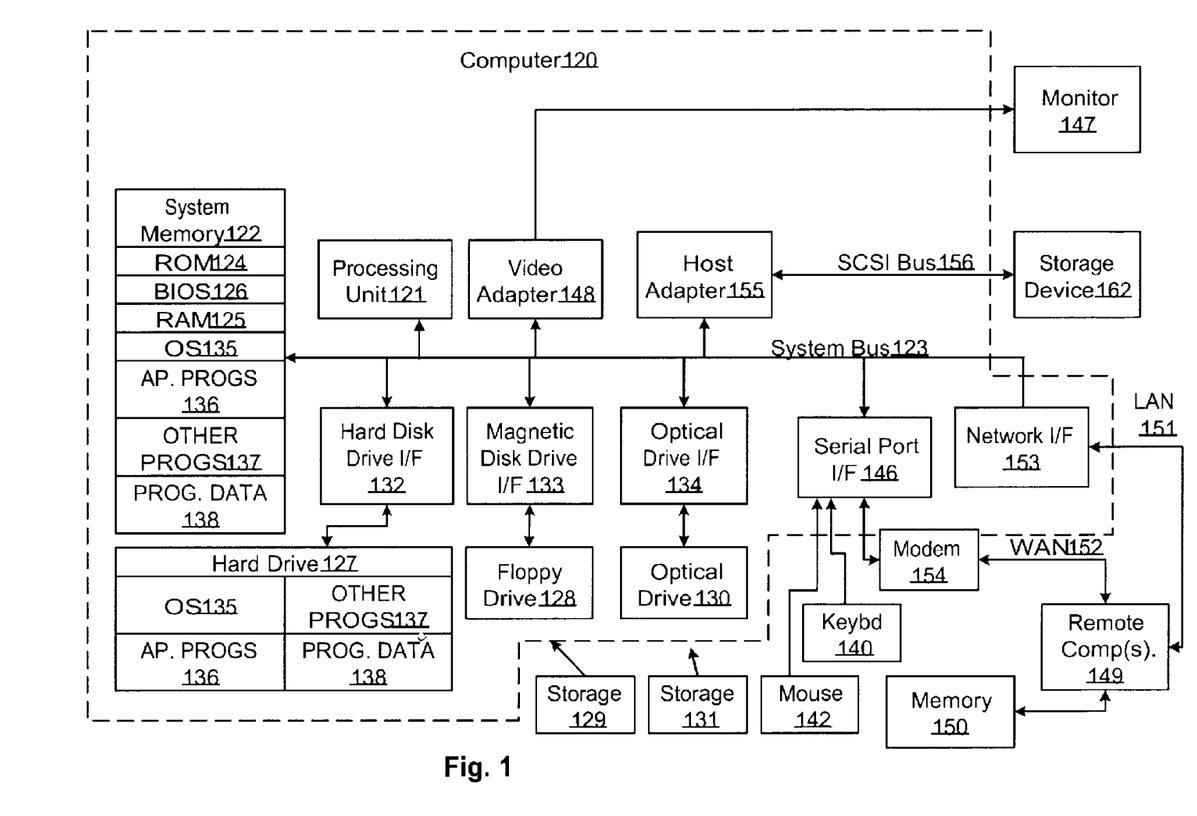
FIG. 1 is a block diagram representing a general purpose computer system in which aspects of the present invention and/or portions thereof may be

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or particular abstract data types. Moreover, it should be appreciated that the and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes conventional personal computer 120 or the like, including a processing unit 121, a system memory 122, and a system bus 123 that couples various system including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and disk drive 130 are connected to the system bus 123 by a hard disk drive interface 132, a magnetic disk drive interface 133, and an optical drive interface 134, respectively. The drives and their associated computer-readable media provide volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the bus, but may be connected by other interfaces, such as a parallel port, game port, universal serial bus (USB). A monitor 147 or other type of display device is also connected to the system bus 123 via an interface, such as a video adapter 148. In addition to the monitor 147, a personal computer typically includes other output devices (not shown), such as speakers and printers. The exemplary system FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary other means of establishing a communications link between the computers may be used.

System and Method of the Present Invention

In the prior art, and as was discussed above, an action is performed by traversing a directed graph and executing an action-specific method at each container or node. The execution of the method can be container-specific and is done by calling through a table of function pointers for the action. That is, each container has a particular type, and the type of container defines which method is executed in connection with a particular action with respect to the container. Typically, the container type is a numerical value that is employed as an offset a method table associated with the action. The method table at each entry thereof therefore contains a pointer to the actual code for implementing the method.

Figure 2:
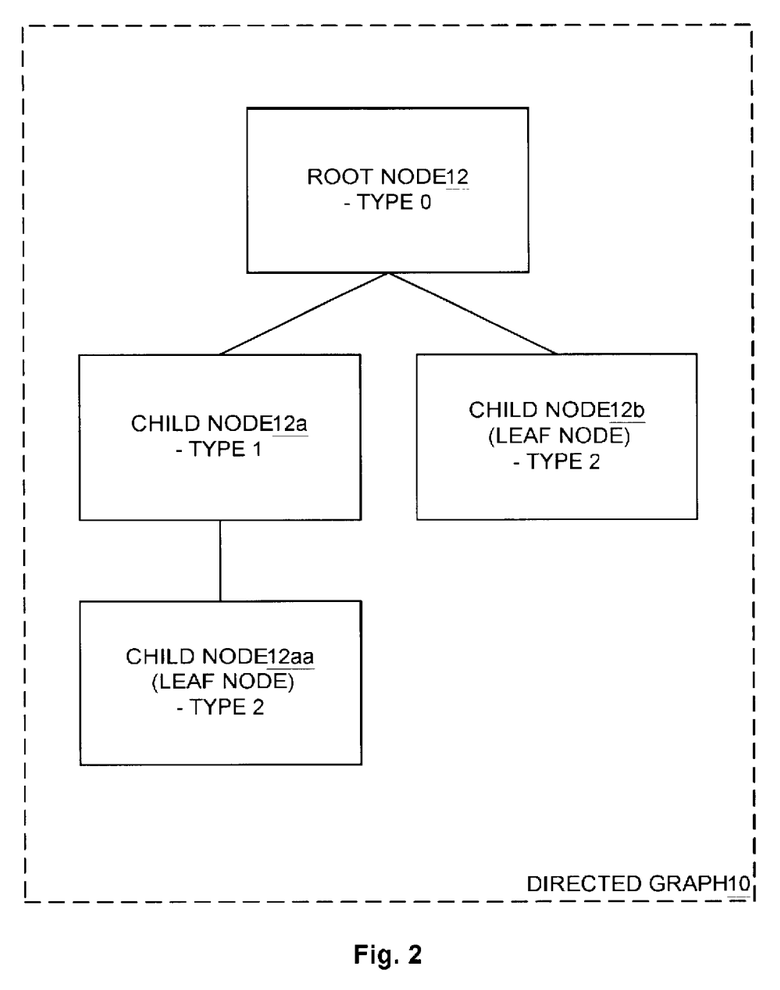
FIG. 2 is a block diagram showing the structure of a directed graph such as that which is traversed in connection with the present invention.

Referring to the drawings in details, wherein like numerals are used to indicate like elements throughout, there is shown in FIG. 2, a directed graph 10 such as that which may be traversed in accordance with the present invention. As discussed above, the directed graph 10 may be a directed acyclic graph such as that which is employed by an application to represent a collection of data. The graph has a root node or container (hereinafter "node") and subsequent nodes branching out from root node and appearing at levels below such root node. In a grossly simplified example as compared with a typical directed graph, which may have thousands of nodes or more, the directed graph 10 of FIG. 2 has a root node 12, a pair of child nodes 12a, 12b, at a second level, and child node 12a has a child node 12aa at a third level. As seen, node 12 is of type 0, node 12a is of type 1, and nodes 12aa 12b are of type 2. Of course, the directed graph 10 may have any particular structure without departing from the spirit and scope of the present invention. Directed graphs 10 are generally known or should be apparent to the relevant and therefore need not be described herein in excessive detail.

With the directed graph 10 shown in FIG. 2, a traversal thereof, typically begins at the root node 12 and then may proceed to child node 12a. Since node 12a has a child (node 12aa), and bearing in mind that child nodes are typically dealt with to siblings, traversal then proceeds to child node 12aa, and then to node 12b. node 12b has no children and is the last child of node 12 to be dealt with, the traversal is then complete.

Figure 3:
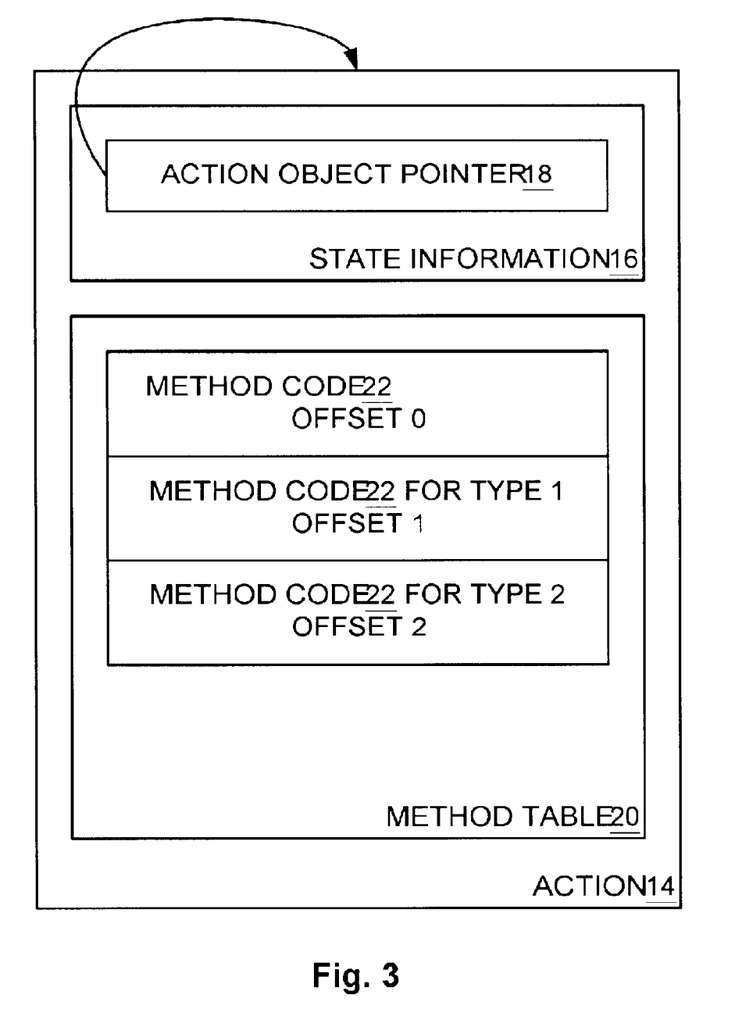
FIG. 3 is a block diagram showing the structure of an action such as that which may be applied to the directed graph of FIG. 2.

Referring now to FIG. 3, a representation of the data structure of a single unchained action 14 is shown. As may be appreciated, the action 14 may be the basis of a traversal of a directed graph such as that shown in FIG. 2. The action 14 shown in FIG. 3 and all other actions 14 shown in the various drawings may be any appropriate actions 14 without departing from the spirit and scope of the present invention. For example, each action 14 may be a draw action for drawing viewable objects based on a directed graph, a cull view action for culling objects to be based on a particular point of view, a cull size action for culling objects to be based on granularity, a cull semantic action for culling objects to be drawn based object attributes, a count action for counting various aspects of a directed graph, a print action for printing various details about a directed graph, or the like. Actions are generally known or should be apparent to the relevant public and therefore not be described herein in excessive detail.

As shown, the action 14 includes various state information 16 including an action object pointer 18, and a method table 20 including various methods to be performed, as represented by code 22, for each type of node in a directed graph being traversed. As may be appreciated, the method table 20 may be separate the action 14 (not shown), in which case the action 14 includes a method table pointer (not shown) pointing to the separate method table. As may also be appreciated, the method code 22 may be separate from the method table 20 (not shown), in which case each entry in the method table 20 includes a method code pointer (not shown) pointing to the separate method code 22. Importantly, use of such method table pointers and/or method code pointers is within the spirit and scope of the present invention.

During traversal of a directed graph 10 such as that shown in FIG. 2, for each node 12, etc., and as discussed above, the node type thereof defines which method code 22 is executed in connection with the action 14 with respect to such node 12, etc. For example, since node 12b is of type 2, such value is employed as an offset within method table 20, and thus points at the third method code 22 down (the method code 22 down being at offset 0). Accordingly, the third method code 22 down at offset 2 is employed with respect to performing the action 14 on node perhaps by way of a call or the like to such method code 22. Such call typically also includes other information including the action object pointer 18 from the state information 16. As seen in FIG. 3, the action object pointer 18 typically points to action 14 itself. Thus, by passing the pointer 18 to the method code 22 during the call, the executing method code 22 knows the calling action 14. Among other things, the executing method code 22 may employ such pointer 18 to modify or examine variables contained within the state information 16 of the action 14.

More particularly, the executing method code 22 may employ a statement therein to continue traversing the directed graph 10 by going on children of the current node 12, etc. Such a "dispatch" type of command may in fact be the word "dispatch". Typically, a 'dispatch' operation is performed on a single child. In particular, the action method calling the dispatch operation determines how many children descend from the current node and then performs a dispatch operation on each child. The dispatch operation determines the type of the child, offset into the method table 20 based on the type value, and then calls the method code 22 as a subroutine. As may be appreciated, then, such dispatch command effectuates traversal of the directed graph 10.

Figure 4:
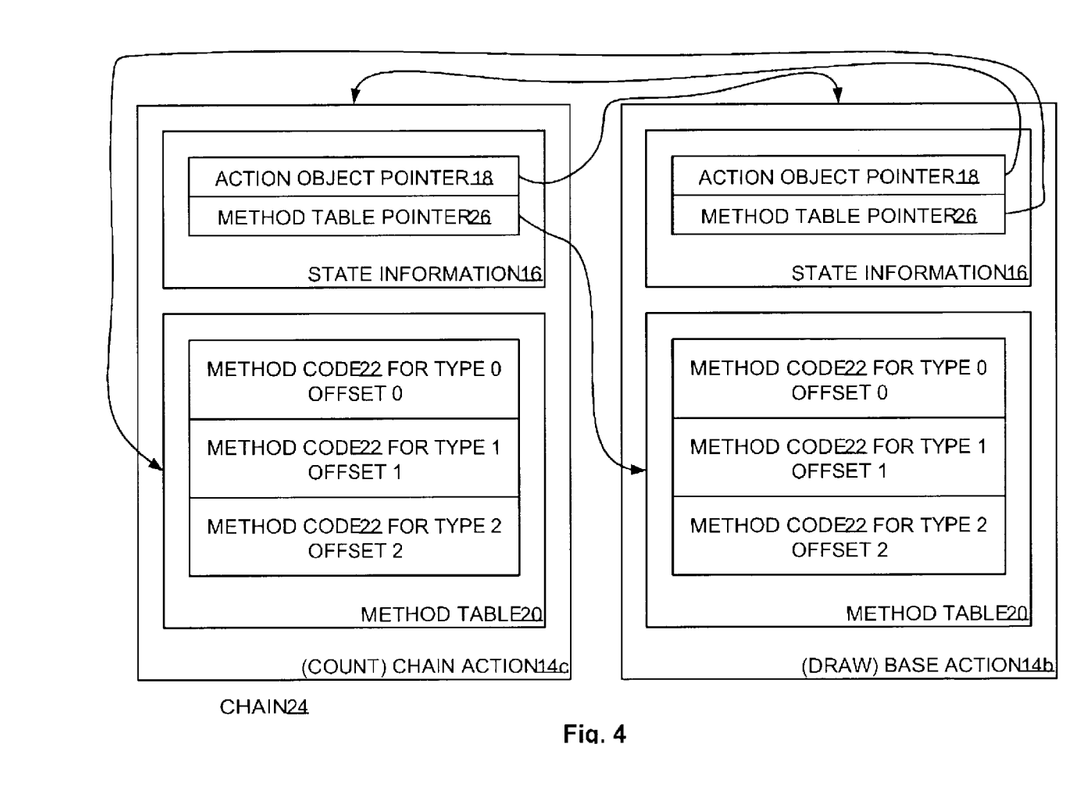
FIG. 4 is a block diagram showing a chain of multiple ones of the action of FIG. in accordance with one embodiment of the present invention.

In one embodiment of the present invention, and referring now to FIG. 4, a plurality of the actions 14 are "chained" together to form a chain 24, where the last action 14 in the chain 24 (i.e., to the right in FIG. 4) is a base action 14b and each other action 14 in the chain 24 (i.e., to the left in FIG. 4) is a chain action 14c. Significantly, the chained actions 14 are performed by traversing the directed 10 a single time and executing action-specific method code 22 for each chained action 14 at each node 12, etc. That is, for each node 12, etc., the type of such 12, etc. defines which method code 22 is executed in connection with each action 14 with respect to the node 12, etc., and the method code 22 from each action 14 performed with respect to the node 12, etc. prior to moving on to the next node etc.

Importantly, the method code 22 of each chain action 14c when finished the method code 22 of the next action 14 in the chain, be it another chain action 14c or the base action 14b, by executing a specially designated command similar the aforementioned dispatch command. Such a command may for example be "dispatch chain". As may be appreciated, employing the methodology of the invention allows for efficient processing as the overhead of calling to the next 14 in a chain is the same as the normal overhead of calling action method code 22 in an action 14. Thus, executing a chain 24 of actions 14 takes no more time to invoke the method codes 22 than would be taken if each action 14 were executed separately. Beneficially, a chain 24 of actions 14 require no intermediate storage, and require only a single traversal of the directed graph 10. Accordingly, memory usage is lower, memory locality is better and performance is much better overall than sequential separate use of actions 14. Also importantly, the method code 22 the base action 14b when finished invokes the continuation of traversing the directed graph 10 by going on to children of the current node 12, etc. by a "dispatch" type of command, which again may in fact be the word "dispatch".

In one embodiment of the present invention, and still referring to FIG. 4, 14 are chained together by having the action object pointer 18 from each chain action 14c point to the next action 14 in the chain 24, be it another chain action or the base action 14b, and by having the action object pointer 18 from the base action 14b point to the chain action 14c at the head of the chain 24. Thus, and regard to each chain action 14c, the pointer 18 causes the executing method code 22 of such chain action 14c to direct control to the next action 14 in the chain 24 once finished. Likewise, and with regard to the base action 14b, the pointer 18 causes the executing method code 22 of such chain action 14c to direct control to the head of the chain 24 after traversal proceeds to the next node 12, etc.

In another embodiment of the present invention (not shown), the actions 14 chained together by providing each action 14 with a second, chaining action object pointer in addition to the action object pointer 18. Here, it is the chaining action object pointer from each chain action 14c that point to the next action 14 in the chain 24, be it another chain action 14c or the base action 14b, and it is the chaining action object pointer 18 from the base action 14b that points to the chain action 14c at the head of the chain 24. Thus, it is the chaining action object pointer that directs control to the next action 14 in the chain 24 and back to the head of chain 24, as the case may be. By providing the chaining action object pointers in addition to the action object pointers 18, and as may be appreciated, the action object pointer 18 of each action 14 is still available to point at such action 14. such action object pointer 18 may be passed as part of a call should the call a pointer back to such action 14.

Note, too, that each action 14 is provided with a chaining action object pointer, and if each action 14 includes a method table pointer to point to a separate table, as was discussed above, such action 14 may also be provided with a method table pointer. In particular, the chaining method table pointer from each chain action 14c would point to the method table 20 of the next action 14 in the chain 24, be it another chain action 14c or the base action 14b, and the method table pointer from the base action 14b would point to the method table 20 of the chain action 14c at the head of the chain 24. Once again, by providing the chaining method table pointers in addition to the method table pointers, and as may be appreciated, each chaining method table pointer may be passed as part of a call should the call require a pointer to the chained-to method table 20.

Following are details regarding creation and execution of chained actions 14 such as those shown in FIG. 4 with regard to a directed graph such as that shown FIG. 2.

Creating the Actions

An application, for example a graphics rendering application (not shown), first creates an object for each action 14 that is to be chained together. Typically, the actions 14 are available to be instantiated as objects from a class of actions 14 or the like. As may be appreciated, the application creates the actions 14 based on an overall result that is desired. For example, the actions 14 may include a variety of cull actions and a draw action so as to draw a pre-determined portion of a directed graph 10. As pointed out above, an action chain 24 consists of any number of actions 14c plus a base action 14b forming the "tail" of the action chain 24. Significantly, though, an action 14 is typically created by an application in a stand-alone state, as shown in FIG. 3, with the base pointer 18 pointing at the action 14 itself.

Chaining the Actions

Accordingly, once the application has created the objects for the actions 14, application chains the objects/actions 14 together. In one embodiment of the present invention, the application employs a chaining method which sets the action object pointers 18 for the actions 14 to in fact create the chain 24. In particular, method sets the action object pointer 18 for each chain action 14c to point to the next action 14 in the chain 24, be it another chain action 14c or the base action and sets the action object pointer 18 for the base action 14b to point to the chain action 14c at the head of the chain 24.

Applying the Chain

In one embodiment of the present invention, the chained actions 14 are to a directed graph 10 by calling an APPLY method on the base action 14b of the chain 24. In the base action 14b, such call results in a call to a START method allows the base action 14b to initialize its state for the apply. After application, APPLY calls an END method which allows the base action 14b to clean up any temporary state generated by APPLY.

Chain actions 14c do the same things that base actions 14b do but also do chain-specific initialization. An action chain 24 is treated as one large object so APPLY is only called once for the chain 24. APPLY must therefore call START and along the entire chain 24 in order to initialize and un-initialize each action 14 in chain 24. APPLY also validates method table pointers (if available) for each action in the chain 24. In the course of doing so, APPLY hooks up the chaining method table pointers (if available) too, so that the chain actions 14c are ready to chain in their action methods.

In applying the chain 24, certain commands may be employed to initialize the actions 14, set up pointers, clean up data, close out actions 14, and the like. Such commands are of an administrative nature and at any rate are not considered to be integral to the present invention. Moreover, such commands are known or should apparent to the relevant public, and therefore are not reproduced herein. Any appropriate initialization, clean up, close out, or other similar commands may be employed without departing from the spirit and scope of the present invention.

Application of the chain 24 to the directed graph in accordance with one embodiment of the present invention is best explained by way of example. Conveniently, a good example exists in the application of the chain 24 of FIG. 4 to the directed graph 10 of FIG. 2, where for present purposes it is to be assumed the chain action 14c of the chain 24 is a count action counting various aspects of directed graph 12, and the base action 14b of the chain 24 is a draw action a view based on the directed graph 12.

As always, traversal begins with the root node which is in this case the node 12 in FIG. 2. In the present invention, the first action 14 to be applied with respect to any node 12, etc. such as the root node 12 is the chain action 14*c* at the head of chain 24. Accordingly, such chain action 14*c* determines from the root node 12 having type 0 that the method code 22 at offset 0 of the method table 20 (i.e., the first method code 22) for the chain action 14*c* should be applied to such root node 12. Here, it is to be assumed that such method code 22 at offset 0 is, in pseudo-code:COUNT [TYPE 0]INCREMENTDISPATCH CHAINRETURNThus, such method code 22 increments a particular counter, and then calls DISPATCH CHAIN. As was set above, calling DISPATCH CHAIN in the present invention invokes the method code of the next action 14 in the chain 24, be it another chain action 14*c* or the base action 14*b*.

Here, the next action 14 in the chain 24 is the draw base action 14*b* at the tail the chain 24. As before, such base action 14*c* determines from the root node 12 having type 0 that the method code 22 at offset 0 of the method table 20 (i.e., the first method code 22) for the base action 14*b* should be applied to such root node 12. Here, it is to be assumed that such method code 22 at offset 0 is, in pseudo-code:DRAW [TYPE 0]{drawing procedures}DISPATCHRETURNThus, such method 22 performs any applicable drawing procedures with regard to the root node 12 (if any), and then calls DISPATCH. As was set forth above, calling DISPATCH in the present invention invokes the continuation of traversing the directed graph 10 by processing children of the current node 12, etc.

Here, and as seen in FIG. 2, the children of node 12 are nodes 12*a* and 12*b*. For purposes of the present example, it is assumed that node 12*a* is examined first. Once again, the first action 14 to be applied with respect to node 12*a* is the chain action 14*c* at the head of the chain 24. Accordingly, such chain action 14*c* determines from the child node 12*a* having type 1 that the method code 22 at 1 of the method table 20 (i.e., the second method code 22) for the chain action should be applied to such node 12*a*. Here, it is to be assumed that such method code 22 at offset 1 is, in pseudo-code:COUNT [TYPE 1]INCREMENTDISPATCH CHAINRETURNOnce again, such method code 22 increments a particular counter, and then calls DISPATCH CHAIN, thereby invoking the method code 22 of the next action 14 in the chain 24, which is the draw base action 14*b* at the tail of the chain 24 in FIG. 4.

Also once again, such base action 14*c* determines from the child node 12*a* having type 1 that the method code 22 at offset 1 of the method table 20 (i.e., the second method code 22) for the base action 14*b* should be applied to such node 12*a*. Here, it is to be assumed that such method code 22 at offset 1 is, in pseudo-code:DRAW [TYPE 1]{drawing procedures}DISPATCHRETURNThus, such method 22 performs any applicable drawing procedures with regard to the child node 12*a* any), and then calls DISPATCH, thereby invoking the continuation of traversing the directed graph 10 by going on to the child of node 12*a*, which in this case is node 12*aa*.

Figures 5, 5A:
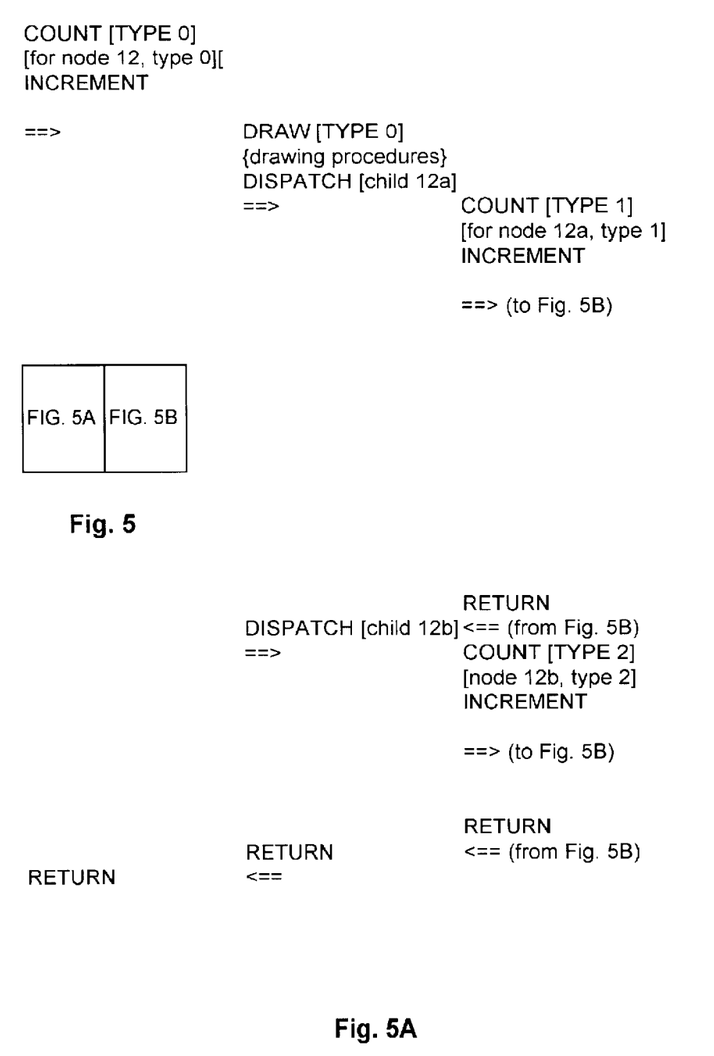
FIG. 5, which is formed from the combination of FIGS. 5A and 5B, is a method code diagram showing the execution of method code from the actions of FIG. 4 as applied to the directed graph of FIG. 2 in accordance with one embodiment of the present invention; and, FIG. 6 is a flow chart showing steps performed in traversing the directed graph of FIG. 2 and applying the actions of FIG. 4 in accordance with one embodiment of the present invention.
Figure 5B:
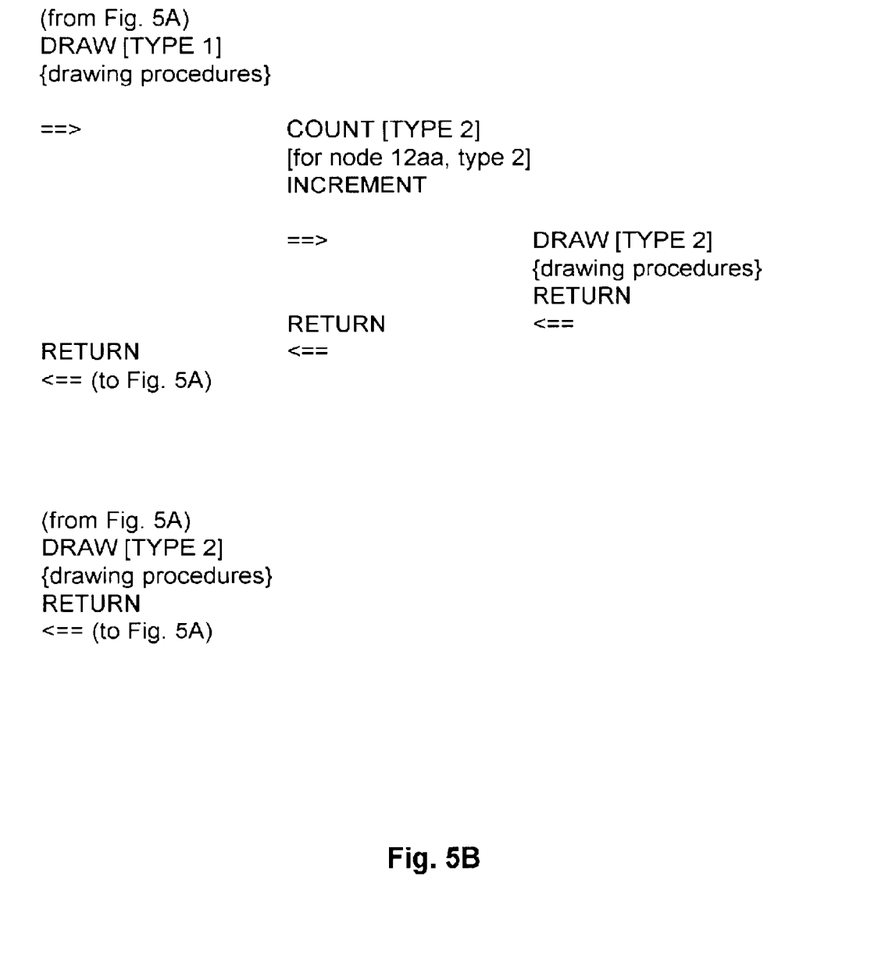

As should now be appreciated, and as fully depicted in FIG. 5, the process of applying the actions 14 and traversing the directed graph 10 continues until all nodes 12, etc. have been examined. As should be understood, the first and second columns of FIG. 5 represent method code 22 performed with regard to the first level of the directed graph 10 of FIG. 2, the first column being the method code 22 of the chain action 14*c* and the second column being the method code 22 of the base action 14*b*. Similarly, the third and fourth columns of FIG. 5 represent method code 22 performed with regard to the second (middle) level of the directed graph of FIG. 2, the third column being the method code 22 of the chain action 14*c* and fourth column being the method code 22 of the base action 14*b*. Likewise, the fifth and sixth columns of FIG. 5 represent method code 22 performed with regard to third (bottom) level of the directed graph 10 of FIG. 2, the fifth column being the method code 22 of the chain action 14*c* and the sixth column being the method code 22 of the base action 14*b*. Appropriate arrows are provided in FIG. 5 to show the direction as processing proceeds from column to column.

Figure 6:
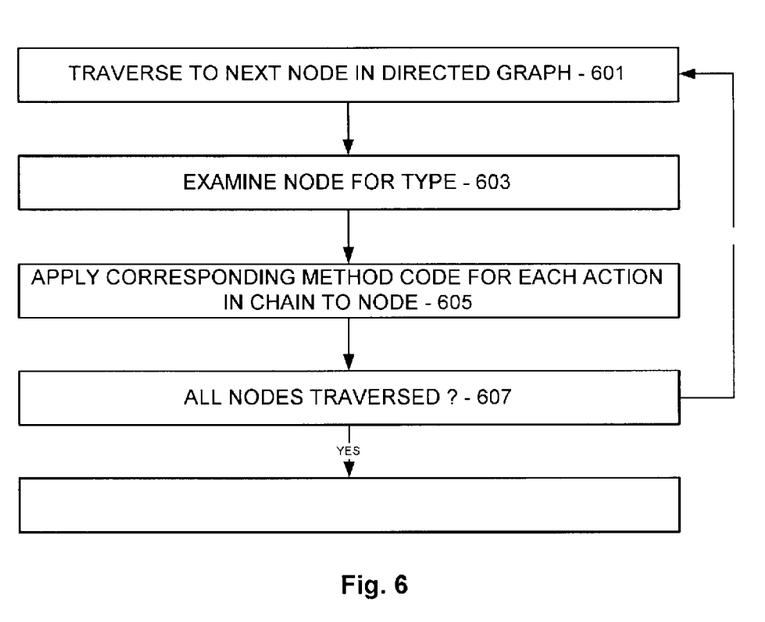

Generally, and referring now to FIG. 6, in the present invention, the process of applying the chain 24 of actions 14 to the directed graph comprises repeatedly: traversing to the next node 12, etc. in the directed graph 12 (step 601); examining the node 12, etc. for type (step 603); and applying corresponding method code 22 for each action 14 in the chain 24 to the node 12, etc. (step 605), until all nodes 12, etc. have been traversed (step 607). Put another way, all of the actions 14 in the chain 24 are applied sequentially on a per-node basis before traversing to the next node 12, etc. Importantly, execution of action methods 22 moves down the chain by the DISPATCH CHAIN calls in the chain action(s) 14*c* and is re-circulated to the head of the chain 24 when the base action 14*b* traverses further down through the directed graph 10 by the DISPATCH call.

As may be appreciated, in the present invention, a base action 14*b* can be included in a chain 24 without any modifications thereto. In particular, the base action 14*b* may be employed in a stand-alone manner or in a chain 24. Any base action 14*b* may be used at the tail of a chain 24, even if the base action 14*b* wasn't originally conceived with chaining in mind.

As may be appreciated from FIG. 5, except for the case of culling as will be set forth below, each method code 22 associated with a chain action 14*c* typically includes a DISPATCH CHAIN, as is necessary to move down the chain 24 to the next action 14*c* or 14*b*. Note, though, that a chain action method 22 can nevertheless include the DISPATCH command. As may be appreciated, the ability to include the DISPATCH command in a chain action method 22 allows a chain 24 to be stopped continued based on a decision made in an action method 22.

Note, too, that an action 14 may be written to act as a base action 14*b* in some circumstances and as a chain action 14*c* in other circumstances, and that the 14 may be written to sense its position within a chain 24 and act accordingly. Note, too, that a chain action 14*c* in a chain 24 may temporarily act as a base action 14*b* or even as a stand-alone action 14 (for example, see Suspending the Chain, Importantly, for a chain action 14*c* to act as a base action 14*b* or the like, the chain action requires an action object pointer 18, a chaining action object pointer, a method table pointer, and a chaining method table pointer, to both point to itself and its own method table and to the next action 14 in the chain 24 and the method table thereof.

Each method code 22 associated with a base action 14*c* need not necessarily include a DISPATCH. In particular, a node 12, etc. having no children (i.e., a "leaf" node) should have a type representative of such condition, and the method code corresponding to such leaf node type need not include a DISPATCH for the reason that such leaf node has no children to examine. Instead, each method code 22 associated with a base action 14*c* and corresponding to a leaf node should end with a RETURN (assuming such RETURN is even required). Accordingly, traversal of the directed graph 10 in effect continues by backing up toward the top of the directed graph and looking for higher level child nodes 12, to examine.

In the case of a node 12, etc. having multiple children, calling DISPATCH on node 12, etc. requires examination of each child. For purposes of illustration in 5, then, the type 0 method code 22 with regard to node 12 and the base action includes DISPATCH [child12*a*] and DISPATCH [child12*b*] even though only one DISPATCH call may actually be made.

If each action 14 does indeed have an action object pointer 18, a chaining object pointer, a method table pointer, and a chaining method table pointer, and should be appreciated, the action object pointer 18 and the method table pointer may be used when DISPATCH is called. Correspondingly, the chaining action object pointer and the chaining method table pointer may be used when DISPATCH CHAIN is called.

In one embodiment, of the present invention, the type of the current node 12, etc. need not be re-examined at each action 14 in the chain 24. Instead, such type determined once, during or shortly after traversal to such current node 12, etc. In particular, each chain action 14*c* includes a method table pointer 26 (FIG. 4) to the method table 20 of the next action 14*c* or 14*b*, and each method code 22 in the table 20 knows its offset. Accordingly, each method code 22 in the table 20 passes control directly to the method code 22 at the same offset in the next method table 20 by way of including the method table pointer 26 and the offset in the DISPATCH CHAIN call.

Culling

A chain action method need not necessarily call to the next action 14 in the chain 24. Thus, and as may be appreciated, a branch of a directed graph 10 may culled from further actions in the chain 24. This is an important case of action composition as an application may wish to build up action chains 24 for rendering which include several culling stages, each one chosen for the specific kind of directed graph 10 that is going to be rendered. Such application therefore has high flexibility in deciding how to build a chain 24 that only does the work that needs to be done for a particular situation.

As alluded to above, in the case of a culling action 14 that is a chain action at least some of the method codes 22 associated therewith do not include a DISPATCH CHAIN. A typical example of a culling action 14*c* is, in pseudo-code:IF NOT XTHEN RETURN ELSE DISPATCH CHAINRETURNAs may be appreciated, then, intentional failure to include such DISPATCH CHAIN call in all possible results in effectuates culling. In particular, failure to include such DISPATCH CHAIN call that the rest of the chain 24 is not processed for the current node 12, etc., and any DISPATCH call in method code 22 of the base action 14*b* of the chain 24 is not processed for the current node 12, etc. Thus, the children of the current node 12, etc. are not processed, and in fact the entire branch of the directed graph from the current node 12, etc. is not processed. In sum, the culling action 14*c* at issue has culled off that branch of the directed graph 10 without any overhead.

Note that a culling action 14 may be a base action 14*b*, in which case at least some of the method codes 22 associated therewith do not include a DISPATCH. However, in the more typical case a culling action is a chain action 14*c* directly or indirectly chained to a base action 14*b* such as a draw action.

Suspending the Chain

There are sometimes situations where it is important to temporarily stop chain processing during an action application. For example, a chain action 14*c* may wish to let the next action 14 in the chain 24 process an entire subsection of the graph 10 on its own, without regard to one or more actions 14*c* at the head of the chain 24. Accordingly, in one embodiment of the present invention, method codes 22 of actions 14 may call Suspend Chain and Resume Chain methods to allow temporary restructuring of the chain 24 in an efficient manner.

In such embodiment, the Suspend Chain method decouples the current action from the next action 14 in the chain 24 so that the next action 14 becomes the top of a new chain 24 of one or more actions 14. The current action 14 then calls the next action 14 toward the tail of the chain 24 normally by way of DISPATCH and further traversal occurs entirely within the new chain 24 without involving what is now the excised portion of the chain 24. When the new chain 24 is finished, processing returns to the current action 14, which then calls the Resume Chain method to re-couple the chain 24 into its original form.

COMPOSITION EXAMPLEChaining actions 14 in a flexible manner allows compliant composition of actions 14 with specific effects. An example of this is an application setting up a chain 24 of actions 14 to render a directed graph 10 representative of a visual scene. The base action 14*b* at the tail of the chain 24 is a draw action as such draw action does all the actual rendering work. An application usually does not need to draw all of the graph 10, though, and so applies various culling strategies to eliminate portions of the graph 10 from consideration before rendering occurs. Some examples of these strategies are view frustum culling, nodes 12, etc. representative of objects outside of the view frustum are ignored; occlusion culling, where nodes 12, etc./objects known to be obscured by other objects already rendered are ignored; and semantic culling, where objects are filtered according to some meaning attached to them. Such types of culling may be combined as necessary for combined culling. As should now be evident, use of a chain 24 of actions 14 that is dynamically created according to current application needs is highly suitable for effectuating such culling and drawing.

Suppose an application has a particular spatially-oriented scene graph and is running on a particular machine which supports accelerated occlusion culling. The application thus may put view frustum and occlusion culling actions in a chain 24 with a draw action so that both types of culling can occur before rendering occurs. Now suppose that a user selects a restricted view so that only certain objects in a scene should be shown. The application can add a semantic culler to the front of chain 24 to achieve such result without needing to change anything else in the 24. If the application is running on a machine that does not support accelerated occlusion culling, the application could omit the occlusion culling action from the chain 24, again without changing anything else. Once again, applications have full flexibility to achieve cumulative effects by dynamically selecting sets of actions and chaining them together.

CONCLUSION

The programming necessary to effectuate the processes performed in connection with the present invention is relatively straight-forward and should be apparent to the relevant programming public. Accordingly, such programming is attached hereto. Any particular programming, then, may be employed to effectuate the present invention without departing from the spirit and scope thereof.

In the foregoing description, it can be seen that the present invention a new and useful method and mechanism for applying multiple actions to a graph in a single traversal of such directed graph. In particular, the present comprises a method and mechanism for "chaining" the multiple actions such that of the multiple actions are applied in sequence to each node in the directed graph before moving on to the next one. By allowing an application to dynamically combine actions in a flexible manner in most any serial chain to perform a desired overall process, the cumulative effect achieved by such chaining of actions is also flexible. Thus actions with very specific effects can be combined in arbitrary ways, and an application can then mix and match actions to suit particular needs. It be appreciated that changes could be made to the embodiments described above without departing from the inventive concepts thereof. It should be understood, therefore, that this invention is not limited to the particular embodiments but it is intended to cover modifications within the spirit and scope of the present invention as defined by the appended claims.

What is claimed is:

1. A method of applying a plurality of actions to a directed graph, the directed graph having a plurality of nodes branching out into multiple levels, the method comprising:
   repeatedly:
      traversing to a node in the directed graph; and
      performing on the traversed-to node an action-specific method for each of the plurality of actions;
   until all nodes in the directed graph have been traversed to, wherein only a single traversal of the directed graph need be performed to apply all of the actions to the directed graph,
   wherein each action has a structure including state information comprising an action object pointer, the method further comprising organizing the plurality of actions into a chain, the actions in the chain including:
      a base action at a tail end of the chain; and
      at least one chain action at a head end of the chain, the action object pointer of each chain action pointing to an immediately adjacent action toward the tail end of the chain, the action object pointer of the base action pointing to the chain action at the head end of the chain,
   wherein upon traversing to a node in the directed graph, an action-specific method for each of the plurality of actions in the chain is performed on the traversed-to node.

2. The method of claim 1 wherein each node in the directed graph has a type, the method comprising:
   repeatedly:
      traversing to a node in the directed graph;
      determining the type of traversed-to node; and
      performing on the traversed-to node an action-specific method for each of the plurality of actions, each action-specific method being selected based on the type of the traversed-to node;
   until all nodes in the directed graph have been traversed to.

3. The method of claim 2 wherein each action has structure including a method table including a method to be performed for each type of node in the directed graph, the method comprising:
   repeatedly:
      traversing to a node in the directed graph;
      determining the type of traversed-to node;
      employing the type of the traversed-to node to select a method within the method table of each action; and
      performing on the traversed-to node the selected method for each of the plurality of actions;
   until all nodes in the directed graph have been traversed to.

4. The method of claim 1 wherein each node of the directed graph has a type, each action having a structure including:
   state information comprising an action object pointer, and
   a method table including a method to be performed for each type of node in the directed graph,
   wherein upon traversing to a node in the directed graph, an action-specific method for each of the plurality of actions in the chain is performed on the traversed-to node, each action-specific method being selected based on the type of the traversed-to node.

5. The method of claim 4 wherein each method table is organized according to the type of the node corresponding to each method, wherein the type of the traversed-to node is employed to select a method within each method table.

6. The method of claim 4 further comprising invoking at an end of each method in each chain action the method of the immediately adjacent action toward the tail end of the chain, the invoked and invoking methods both corresponding to the same type of node.

7. The method of claim 6 comprising invoking the method of the immediately adjacent action toward the tail end of the chain based on the action object pointer of the action.

8. The method of claim 4 further comprising invoking at an end of each method in the base action a traversal to a next node in the directed graph and a method of the action at the head end of the chain, the invoked methods corresponding to the type of the traversed-to node.

9. The method of claim 8 comprising invoking the method of the action at the head end of the chain based on the action object pointer of the base action.

10. A computer-readable storage medium having computer-executable instructions thereon for performing a method of applying a plurality of actions to a directed graph, the directed graph having a plurality of nodes branching out into multiple levels, the instructions being organized into modules comprising:
   a first module for traversing to a node in the directed graph; and
   a second module for performing on the traversed-to node an action-specific method for each of the plurality of actions,
   the first and second modules being repeatedly called until all nodes in the directed graph have been traversed to, wherein only a single traversal of the directed graph need be performed to apply all of the actions to the directed graph,
   wherein each action has a structure including state information comprising an action object pointer, the modules further comprising a third module for organizing the plurality of actions into a chain, the actions in the chain including:
      a base action at a tail end of the chain; and
      at least one chain action at a head end of the chain, the action object pointer of each chain action pointing to an immediately adjacent action toward the tail end of the chain, the action object pointer of the base action pointing to the chain action at the head end of the chain,
   wherein upon traversing to a node in the directed graph, an action-specific method for each of the plurality of actions in the chain is performed on the traversed-to node.

11. The medium of claim 10 wherein each node in the directed graph has a type, the modules comprising:
- a first module for traversing to a node in the directed graph;
- a second module for determining the type of traversed-to node; and
- a third module for performing on the traversed-to node an action-specific method for each of the plurality of actions, each action-specific method being selected based on the type of the traversed-to node;
- the first, second and third modules being repeatedly called until all nodes in the directed graph have been traversed to.

12. The medium of claim 11 wherein each action has structure including a method table including a method to be performed for each type of node in the directed graph, the modules comprising:
- a first module for traversing to a node in the directed graph;
- a second module for determining the type of traversed-to node;
- a third module for employing the type of the traversed-to node to select a method within the method table of each action; and
- a fourth module for performing on the traversed-to node the selected method for each of the plurality of actions;
- the first, second and third modules being repeatedly called until all nodes in the directed graph have been traversed to.

13. A computer having computer-executable instructions thereon for performing a method of applying a plurality of actions to a directed graph, the directed graph having a plurality of nodes branching out into multiple levels, the instructions being organized into modules comprising:
- a first module for traversing to a node in the directed graph; and
- a second module for performing on the traversed-to node an action-specific method for each of the plurality of actions,
- the first and second modules being repeatedly called until all nodes in the directed graph have been traversed to, wherein only a single traversal of the directed graph need be performed to apply all of the actions to the directed graph,
- wherein each action has a structure including state information comprising an action object pointer, the modules further comprising a third module for organizing the plurality of actions into a chain, the actions in the chain including:
  - a base action at a tail end of the chain; and
  - at least one chain action at a head end of the chain, the action object pointer of each chain action pointing to an immediately adjacent action toward the tail end of the chain, the action object pointer of the base action pointing to the chain action at the head end of the chain,
  - wherein upon traversing to a node in the directed graph, an action-specific method for each of the plurality of actions in the chain is performed on the traversed-to node.

14. The computer of claim 13 wherein each node in the directed graph has a type, the modules comprising:
- a first module for traversing to a node in the directed graph;
- a second module for determining the type of traversed-to node; and
- a third module for performing on the traversed-to node an action-specific method for each of the plurality of actions, each action-specific method being selected based on the type of the traversed-to node;
- the first, second and third modules being repeatedly called until all nodes in the directed graph have been traversed to.

15. The computer of claim 14 wherein each action has structure including a method table including a method to be performed for each type of node in the directed graph, the modules comprising:
- a first module for traversing to a node in the directed graph;
- a second module for determining the type of traversed-to node;
- a third module for employing the type of the traversed-to node to select a method within the method table of each action; and
- a fourth module for performing on the traversed-to node the selected method for each of the plurality of actions;
- the first, second and third modules being repeatedly called until all nodes in the directed graph have been traversed to.

16. A computer having a chain structure instantiated thereon, the chain comprising a plurality of actions to be applied to a directed graph, the directed graph having a plurality of nodes, each action having a structure including state information comprising an action object pointer, the actions including:
- a base action at a tail end of the chain; and
- at least one chain action at a head end of the chain, the action object pointer of each chain action pointing to an immediately adjacent action toward the tail end of the chain, the action object pointer of the base action pointing to the chain action at the head end of the chain,
- wherein upon traversing to a node in the directed graph, an action-specific method for each of the plurality of actions in the chain is performed on the traversed-to node,
- wherein each node of the directed graph has a type, each action having a structure including:
  - state information comprising an action object pointer, and
  - a method table including a method to be performed for each type of node in the directed graph,
  - wherein upon traversing to a node in the directed graph, an action-specific method for each of the plurality of actions in the chain is performed on the traversed-to node, each action-specific method being selected based on the type of the traversed-to node,
  - wherein each method table is organized according to the type of the node corresponding to each method therein, wherein the type of the traversed-to node is employed to select a method within each method table.

* * * * *

UNITED STATES PATENT AND TRADEMARK OFFICE
CERTIFICATE OF CORRECTION

PATENT NO. : 6,738,777 B2
DATED : May 18, 2004
INVENTOR(S) : Andrew Bliss

It is certified that error appears in the above-identified patent and that said Letters Patent is hereby corrected as shown below:

Title page,
Item [57], ABSTRACT,
Line 3, delete "specific" and insert -- action-specific --, therefore.
Lines 4-5, delete "traversed-node" and insert -- traversed-to node --, therefore.

Drawings,
Sheet 3 of 7, Fig. 3, after "METHOD CODE22" insert -- FOR TYPE 0 --.
Sheet 5 of 7, Fig. 4, below "INCREMENT" insert -- DISPATCH CHAIN --.
Sheet 5 of 7, Fig. 11, below "INCREMENT" insert -- DISPATCH CHAIN --.
Sheet 5 of 7, Fig. 6, below "INCREMENT" insert -- DISPATCH CHAIN --.
Sheet 6 of 7, Fig. 4, below "{drawing procedures}" insert -- DISPATCH --.
Sheet 6 of 7, Fig. 9, below "[for node 12aa, type 2]" insert -- DISPATCH CHAIN --.
Sheet 7 of 7, Last Box, insert -- END --.

Column 1,
Line 21, after "directed" insert -- graph --.
Line 31, after "the" insert -- scene --.
Line 43, after "be" insert -- discernible. --.
Line 58, after "node," insert -- where --.
Line 64, delete "1)th" and insert -- (n-1)th --, therefore.

Column 2,
Line 12, after "time" insert -- limit --.
Line 52, after "performed to" insert -- apply --.

Column 3,
Line 9, after "may be" insert -- incorporated --.
Line 42, after "or" insert -- implement --.
Line 43, after "the" insert -- invention --.
Line 58, insert -- components -- before "including".

Column 4,
Line 5, after "disk" insert -- drive --.
Line 7, after "and" insert -- optical --.
Line 11, delete "volatile" and insert -- non-volatile --, therefore.
Line 20, after "flash" insert -- memory --.
Line 33, after "the" insert -- system --.
Line 35, insert -- or -- before "universal".
Line 39, after "other" insert -- peripheral --.

UNITED STATES PATENT AND TRADEMARK OFFICE
CERTIFICATE OF CORRECTION

PATENT NO.    : 6,738,777 B2
DATED         : May 18, 2004
INVENTOR(S)   : Andrew Bliss It is certified that error appears in the above-identified patent and that said Letters Patent is hereby corrected as shown below:

Column 5,
Line 15, after "offset" insert -- within --.
Line 37, after "relevant" insert -- public --.
Line 44, after "with" insert -- prior --.

Column 6,
Line 4, after "separate" insert -- from --.
Line 20, after "the" (2$^{nd}$ occurrence) insert -- first --.
Line 23, after "node" insert -- 12b, --.
Line 54, after "directed" insert -- graph --.
Line 61, after "node" insert -- 12, --.
Line 63, after "finished" insert -- invokes --.

Column 7,
Line 21, after "chain action" insert -- 14c --.
Line 48, after "the call" insert -- require --.
Line 52, after "separate" insert -- method --.

Column 8,
Line 41, insert -- END -- before "along".
Line 43, after "action" insert -- 14 --.
Line 65, after "action" insert -- drawing --.

Column 9,
Line 8, delete "COUNT [TYPE 0]INCREMENTDISPATCH CHAINRETURN" and insert the same on line 9 as:
-- COUNT [TYPE 0]
   INCREMENT
   DISPATCH CHAIN
   RETURN --, therefore.
Line 13, after "code" insert -- 22 --.
Line 21, delete "DRAW [TYPE 0]{drawing procedures} DISPATCHRETURN" and insert the same on line 22 as:
-- DRAW [TYPE 0]
   {drawing procedures}
   DISPATCH
   RETURN --, therefore.
Line 23, after "method" insert -- code --.
Line 35, after "at" insert -- offset --.
Line 37, after "action" insert -- 14c --.

UNITED STATES PATENT AND TRADEMARK OFFICE
CERTIFICATE OF CORRECTION

PATENT NO.    : 6,738,777 B2
DATED         : May 18, 2004
INVENTOR(S)   : Andrew Bliss It is certified that error appears in the above-identified patent and that said Letters Patent is hereby corrected as shown below:

Column 9 (cont'd),
Line 39, delete "COUNT [TYPE 1]INCREMENTDISPATCH CHAINRETURN" and insert the same on line 40 as:
-- COUNT [TYPE 1]
   INCREMENT
   DISPATCH CHAIN
   RETURN --, therefore.
Line 50, delete "DRAW [TYPE 1]{drawing procedures} DISPATCHRETURN" and insert in the same on line 51 as:
-- DRAW [TYPE 1]
   {drawing procedures}
   DISPATCH
   RETURN --, therefore.
Line 51, after "method" insert -- code --.
Line 53, after "12a" delete "any)" and insert -- (if any) --, therefore.
Line 62, after "first" insert -- top --.

Column 10,
Line 21, after "chain" (first occurrence) insert -- 24 --.
Line 28, after "Any" insert -- arbitrary --.
Line 59, after "code" insert -- 22 --.

Column 11,
Line 4, after "action" insert -- 14b --.
Line 42, after "action" insert -- 14c, --.
Lines 44-46, delete "IF NOT XTHEN RETURN ELSE DISPATCH CHAINRETURN" and insert the same on line 45 as:
-- IF NOT X
        THEN RETURN
        ELSE DISPATCH CHAIN
RETURN --, therefore.
Line 54, after "graph" insert -- extending --.

Column 12,
Line 19, delete "Chaining actions 14 in a" and insert the same on the next line.
Line 67, after "invention" insert -- comprises --.

UNITED STATES PATENT AND TRADEMARK OFFICE
CERTIFICATE OF CORRECTION

PATENT NO. : 6,738,777 B2
DATED : May 18, 2004
INVENTOR(S) : Andrew Bliss

It is certified that error appears in the above-identified patent and that said Letters Patent is hereby corrected as shown below:

Column 13,
Line 16, after "embodiments" insert -- disclosed, --.

Signed and Sealed this

Twenty-first Day of June, 2005

JON W. DUDAS
*Director of the United States Patent and Trademark Office*